(12) United States Patent
Freire et al.

(10) Patent No.: US 8,190,633 B2
(45) Date of Patent: May 29, 2012

(54) ENABLING PROVENANCE MANAGEMENT FOR PRE-EXISTING APPLICATIONS

(75) Inventors: Juliana Freire, Salt Lake City, UT (US); Claudio T. Silva, Salt Lake City, UT (US); Steven P. Callahan, Centerville, UT (US); Carlos E. Scheidegger, Salt Lake City, UT (US); Huy T. Vo, Murray, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 990 days.

(21) Appl. No.: 12/140,110

(22) Filed: Jun. 16, 2008

(65) Prior Publication Data

US 2009/0310816 A1    Dec. 17, 2009

(51) Int. Cl.
*G06F 7/00* (2006.01)
(52) U.S. Cl. .......................... 707/778; 707/797
(58) Field of Classification Search .................. 707/778, 707/786
See application file for complete search history.

(56) References Cited

U.S. PATENT DOCUMENTS

| | | | |
|---|---|---|---|
| 5,999,182 A | 12/1999 | Etchemendy et al. | |
| 7,370,325 B1 | 5/2008 | Hull et al. | |
| 2003/0135520 A1 | 7/2003 | Mitchell et al. | |
| 2003/0135619 A1 | 7/2003 | Wilding et al. | |
| 2004/0103124 A1 | 5/2004 | Kupkova | |
| 2004/0250201 A1 | 12/2004 | Caspi | |
| 2005/0081105 A1 | 4/2005 | Wedel et al. | |
| 2005/0093881 A1 | 5/2005 | Okita et al. | |
| 2005/0119988 A1 | 6/2005 | Buch et al. | |
| 2005/0132048 A1 | 6/2005 | Kogan et al. | |
| 2005/0138160 A1 | 6/2005 | Klein et al. | |
| 2005/0228816 A1* | 10/2005 | McCauley et al. | 707/102 |
| 2006/0080369 A1* | 4/2006 | Razdow et al. | 707/204 |
| 2006/0190184 A1 | 8/2006 | Sasinowski et al. | |
| 2006/0229924 A1 | 10/2006 | Aron et al. | |
| 2007/0088957 A1 | 4/2007 | Carson | |
| 2007/0128899 A1* | 6/2007 | Mayer | 439/152 |
| 2008/0134178 A1* | 6/2008 | Fitzgerald et al. | 718/1 |
| 2008/0141180 A1* | 6/2008 | Reed et al. | 715/854 |
| 2008/0177994 A1* | 7/2008 | Mayer | 713/2 |
| 2008/0256138 A1* | 10/2008 | Sim-Tang | 707/202 |
| 2009/0171731 A1* | 7/2009 | Bobak et al. | 705/8 |

OTHER PUBLICATIONS

International Preliminary Report on Patentability received in PCT/US2009/047342, Dec. 29, 2010.

(Continued)

*Primary Examiner* — James Trujillo
*Assistant Examiner* — Linh Black
(74) *Attorney, Agent, or Firm* — Bell & Manning, LLC

(57) ABSTRACT

A method of providing provenance management for a pre-existing application is provided. A provenance data selection is received. The provenance data selection indicates provenance data to present to a user. The provenance data is presented to the user as a version tree comprising a plurality of connected nodes. A node selection is received. The node selection indicates a node selected from the version tree. One or more nodes from a root node of the plurality of connected nodes to the node selected from the version tree are identified. One or more action parameters associated with the identified one or more nodes are identified. An action parameter of the one or more action parameters is associated with a previous interaction with a pre-existing application. Presentation of a state of the pre-existing application associated with the node selected from the version tree is triggered.

17 Claims, 4 Drawing Sheets

OTHER PUBLICATIONS

Anderson et al., "Visualization in Radiation Oncology: Towards Replacing the Laboratory Notebook," SCI Institute Technical Report, Apr. 5, 2006, 9 pages.

Frew et al., "Earth System Science Workbench: A Data Management Infrastructure for Earth Science Products," In *Proceedings of SSDBM*, pp. 180-189, Jul. 18-20, 2001.

Groth et al., "An Architecture for Provenance Systems," Technical report, ECS, University of Southampton, Nov. 29, 2006, 162 pages.

Scheidegger et al., "*Tackling the Provenance Challenge One Layer at a Time*," In Concurrency and Computation: Practice and Experience, 20(5), 2008, 10 pages.

Silva, et al., "*Provenance for Visualizations: Reproducibility and Beyond*," IEEE Computing in Science & Engineering, 9(5):82-29, Sep./Oct. 2007, pp. 82-89.

Krasner et al., "A Description of the Model-View-Controller User Interface Paradigm in the Smalltalk-80 System," Journal of Object-Oriented Programming, vol. 3, Aug. 1988, 34 pages.

Scheidegger et al., "*Querying and Creating Visualizations by Analogy*," IEEE Trans. Vis. Comp. Graphics (Proceedings of IEEE Vis 2007) 13(6):1560-1567, Nov. 2, 2007.

Freire et al., "*Managing Rapidly-Evolving Scientific Workflows*," In the proceedings of the International Provenance and Annotation Workshop (IPAW), LNCS 4145, May 3-5, 2006, 8 pages.

Callahan et al., "*Using Provenance to Streamline Data Exploration through Visualization*," SCI Institute Technical Report, No. UUSCI-2006-016, University of Utah, Apr. 5, 2006, 13 pages.

Callahan et al., "*Managing the Evolution of Dataflows with VisTrails*," IEEE Workshop on Workflow and Data Flow for Scientific Applications (SciFlow), Atlanta, Georgia, Apr. 8, 2006, 5 pages.

Becker et al., "Auditing of Data Analyses," SIAM Journal of Scientific and Statistical Computing, 9(4):747-760, Jul. 1988.

Barbosa et al., "An Adaptive Crawler for Locating Hidden-Web Entry Points," In Proceedings of the 16th International World Wide Web Conference (WWW), Banff, Alberta, Canada, May 8-12, 2007, 10 pages.

Barbosa et al., "Combining Classifiers to Identify Online Databases," In Proceedings of the 16th International World Wide Web Conference (WWW), Banff, Alberta, Canada, May 8-12, 2007, 9 pages.

Barbosa et al., "Organizing Hidden-Web Databases by Clustering Visible Web Documents," In Proceedings of the IEEE 23rd International Conference on Data Engineering (ICDE), Istanbul, Apr. 14, 2007, 10 pages.

Barbosa et al., "Automatically Constructing a Directory of Molecular Biology Databases," In Proceedings of the International Workshop on Data Integration in the Life Sciences 2007 (DILS), Philadelphia, Jun. 27, 2007, 10 pages.

Barbosa et al., "Searching for Hidden-Web Databases," In Proceedings of the 8th ACM SIGMOD International Workshop on Web and Databases (WebDB), Baltimore, Maryland, Jun. 16-17, 2005, 6 pages.

Barbosa et al., "Siphoning Hidden-Web Data through Keyword-Based Interfaces," In Proceedings of the 19th Brazilian Symposium on Databases (SBBD), Brasilia, Oct. 18, 2004, 13 pages.

Barbosa et al., "Automatically Constructing Collections of Online Databases," The ACM 15th Conference on Information and Knowledge Management, Arlington, Virginia, pp. 796-797, Nov. 5, 2006.

International Search Report and Written Opinion for PCT/US2009/047342 mailed Dec. 29, 2009.

Altintas et al., An Extensible System for Design and Execution of Scientific Workflows, Proceedings of the 16th International Conference on Scientific and Statistical Database Management, Aug. 5, 2004, pp. 423.

McPhillips et al., An Approach for Pipelining Nested Collections in Scientific Workflows, SIGMOD Record, Sep. 2005, pp. 12-17, vol. 34—No. 3.

Non-Final Office Action issued in U.S. Appl. No. 11/697,922, by the US Patent and Trademark Office Examiner Timothy Padot, on Aug. 17, 2010.

Non-Final Office Action issued in U.S. Appl. No. 11/697,926, by the US Patent and Trademark Office Examiner Timothy Padot, on Oct. 13, 2010.

Non-Final Office Action issued in U.S. Appl. No. 11/697,929, by the US Patent and Trademark Office Examiner Luis F. Santiago, on Oct. 14, 2010.

Bavoil et al., Vistrails: Enabling Interactive Multiple-View Visualizations, In Proceeding of IEEE Visualization 2005, pp. 18.

Kim, Document based workflow modeling: Case based Reasoning Approach, 2002.

Bae et al., Process Mining, Discovery, and Integration using Distance Measures, IEEE International Conference on Web Services, 2006.

Bae et al., Process Mining by Measuring Process Block Similarity, Business Processing Intelligence Workshop, Sep. 4, 2006.

McCann, ScyFlow an Environment for the visual Specification and Execution of Scientific Workflows, Concurrency and Computation: Practice and Experience, Dec. 13, 2005, pp. 1155-1167, vol. 18—No. 10.

\* cited by examiner

ENABLING PROVENANCE MANAGEMENT FOR PRE-EXISTING APPLICATIONS

REFERENCE TO GOVERNMENT RIGHTS

This invention was made with United States government support awarded by the following agencies: National Science Foundation, Award Nos. IIS-58501122 and IIP-0712592. The United States government has certain rights in this invention.

CROSS-REFERENCE TO RELATED APPLICATIONS

This application is related to U.S. patent application Ser. Nos. 11/697,922, 11/697,926, and 11/697,929 that were filed Apr. 9, 2007 and which each claim the benefit of U.S. Provisional Patent Application Ser. No. 60/790,046 that was filed Apr. 7, 2006, the disclosures of which are incorporated by reference in their entirety.

FIELD

The field of the disclosure relates generally to provenance management. More specifically, the disclosure relates to the capture and modeling of provenance information captured during execution of a pre-existing application.

BACKGROUND

Recently, the volume of information generated has been growing at an exponential rate. Since 2003, new information generated annually exceeds the amount of information created in all previous years. Digital information now makes up more than 90% of all information produced, vastly exceeding data generated on paper and film. One of the greatest scientific and engineering challenges of the 21st century is to effectively understand and leverage this growing wealth of data. Computational processes are widely-used to analyze, understand, integrate, transform, and generate data. For example, to understand trends in multi-dimensional data in a data warehouse, analysts generally go through an often time-consuming process of iteratively drilling down and rolling up through the different axes to find interesting 'nuggets' in the data. To mine data, various third party applications may be used to process and analyze the data and to present results using a graphical user interface. There are also applications that are used to generate data, e.g., movies, games. Due to their exploratory nature, these tasks sometimes involve large numbers of trial-and-error steps.

Ad-hoc approaches to data analysis, generation, exploration, integration, and transformation are currently used, but these approaches have serious limitations. In particular, users (e.g., scientists and engineers) need to expend substantial effort managing data and recording provenance information so that basic questions can be answered relative to who created and/or modified a data product and when, what the process used to create the data product was, and whether or not two data products are derived from the same raw data. Provenance information (also referred to as audit trail, lineage, and pedigree) captures information about the steps used to generate a given data product. As a result, provenance information provides important documentation that is key to preserving the data, to determining the data's quality and authorship, to reproducing the data, and to validating the results. The process is time-consuming and error-prone. The absence of systematic mechanisms that capture provenance information makes it difficult (and sometimes impossible) to reproduce and share results, to solve problems collaboratively, to validate results with different input data, to understand the process used to solve a particular problem, and to re-use the knowledge involved in the creating or following of a process. Additionally, the longevity of the data products may be limited without precise and adequate information related to how the data product was generated.

Although for simple exploratory tasks manual approaches to provenance management may be feasible, that is not the case for complex computational tasks that involve large volumes of data and/or involve a large number of users. The problem of managing provenance data is compounded by the fact that large-scale projects often require that groups with different expertise, and often in different geographic locations, collaborate to solve a problem. Consider, for example, exploratory computational tasks where users may need to select different algorithms and visualization techniques for processing and analyzing the data. The task specification is adjusted in an iterative process as the user generates, explores, and evaluates hypotheses associated with the information under study. To successfully analyze and validate various hypotheses, it is necessary to pose queries, correlate disparate data, and create insightful data products of both the simulated processes and observed phenomena.

Visualization is a key enabling technology in the comprehension of vast amounts of data being produced because it helps people explore and explain data. A basic premise supporting use of visualization is that visual information can be processed by a user at a much higher rate than raw numbers and text. However, data exploration through visualization requires scientists to go through several steps. To construct insightful visualizations, users generally go through an exploratory process. Before users can view and analyze results, they need to assemble and execute complex pipelines (workflows) by selecting data sets, specifying a series of operations to be performed on the data, and creating an appropriate visual representation.

Often, insight comes from comparing the results of multiple visualizations created during the exploration process. For example, by applying a given visualization process to multiple datasets generated in different simulations; by varying the values of certain visualization parameters; or by applying different variations of a given process (e.g., which use different visualization algorithms) to a dataset, insight can be gained. Unfortunately, this exploratory process contains many manual, error-prone, and time-consuming tasks. For example, in general, modifications to parameters or to the definition of a workflow are destructive which places the burden on the user to first construct the visualization and then to remember the input data sets, parameter values, and the exact workflow configuration that led to a particular image. This problem is compounded when multiple people need to collaboratively explore data.

Workflows are emerging as a paradigm for representing and managing complex computations. Workflows can capture complex analysis processes and the creation of digital objects at various levels of detail and capture the provenance information necessary for reproducibility, result publication, and result sharing among collaborators. Because of the formalism they provide and the automation they support, workflows have the potential to accelerate and to transform the information analysis process. Workflows are rapidly replacing primitive shell scripts as evidenced by the release of Automator by Apple®, Data Analysis Foundation by Microsoft®, and Scientific Data Analysis Solution by SGI®.

Scientific workflow systems have recently started to support capture of data provenance. However, different systems capture different kinds of data and use different models to represent these data, making it hard to combine the provenance they derive and to share/re-use tools for querying the stored data. Another important limitation of current scientific workflow systems is that they fail to provide the necessary provenance infrastructure for exploratory tasks. Although these systems are effective for automating repetitive tasks, they are not suitable for applications that are exploratory in nature where change is the norm. Obtaining insights involves the ability to store temporary results, to make inferences from stored knowledge, to follow chains of reasoning backward and forward, and to compare several different results. Thus, during an exploratory computational task, as hypotheses are created and tested, a large number of different, albeit related workflows are created. By focusing only on the provenance of derived data products, existing workflow systems fail to capture data about the evolution of the workflow (or workflow ensembles) created by users to solve a given problem. The evolution of workflows used in exploratory tasks, such as data analysis, contain useful knowledge that can be shared and re-used and the underlying information can be leveraged to simplify exploratory activities. There are also applications for assembling computational tasks and deriving digital object that are not represented as explicit workflows, but that share similar limitations when it comes to provenance capture.

Currently, there are no general provenance management systems or tools that can be used in conjunction with pre-existing applications including word processors, web browsers, and generally any GUI-based, event-driven application. For these applications, users that do not have the resources or expertise to build the provenance infrastructure needed resort to the manual creation and maintenance of this information, greatly hindering their ability to do large-scale and/or complex data exploration and processing. Even with the resources, application-dependent solutions are not general and can be hard to re-use in different settings and applications causing problems with interoperability due to differences in the provenance models used across systems. Thus, what is needed is a method and a system for providing provenance infrastructure and design systems that are flexible and adaptable to the wide range of requirements of various pre-existing software applications.

SUMMARY

A method and a system for capturing, storing, querying, and/or interacting with provenance information for pre-existing software applications is provided in an exemplary embodiment. By consolidating provenance information for a variety of software applications, a uniform environment for querying, sharing, and re-using provenance in large-scale, collaborative settings is provided. Modifications to a data product using a pre-existing software application are captured as the user generates, explores, and evaluates hypotheses associated with data under study.

In an exemplary embodiment, a method of providing provenance management for a pre-existing application is provided. A provenance data selection is received. The provenance data selection indicates provenance data to present to a user. The provenance data is presented to the user as a version tree comprising a plurality of connected nodes. A node selection is received. The node selection indicates a node selected from the version tree. One or more nodes from a root node of the plurality of connected nodes to the node selected from the version tree are identified. One or more action parameters associated with the identified one or more nodes are identified. An action parameter of the one or more action parameters is associated with a previous interaction with a pre-existing application. Presentation of a state of the pre-existing application associated with the node selected from the version tree is triggered.

In another exemplary embodiment, a device for providing provenance management for a pre-existing application is provided. The device includes, but is not limited to, a processor and a computer-readable medium including computer-readable instructions stored therein that, upon execution by the processor, cause the device to perform the operations of the method of providing provenance management for a pre-existing application.

In yet another exemplary embodiment, a computer-readable medium is provided. The computer-readable medium includes computer-readable instructions stored therein that, upon execution by a processor, cause a computing device to perform the operations of the method of providing provenance management for a pre-existing application.

In still another exemplary embodiment, a method of capturing actions during interactions with a pre-existing application to support provenance management is provided. An action associated with an interaction with a pre-existing application is captured by utilizing an undo mechanism of the pre-existing application. The captured action is stored. A presentation of a state of the pre-existing application associated with the captured action is triggered by utilizing a redo mechanism of the pre-existing application and the stored action.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
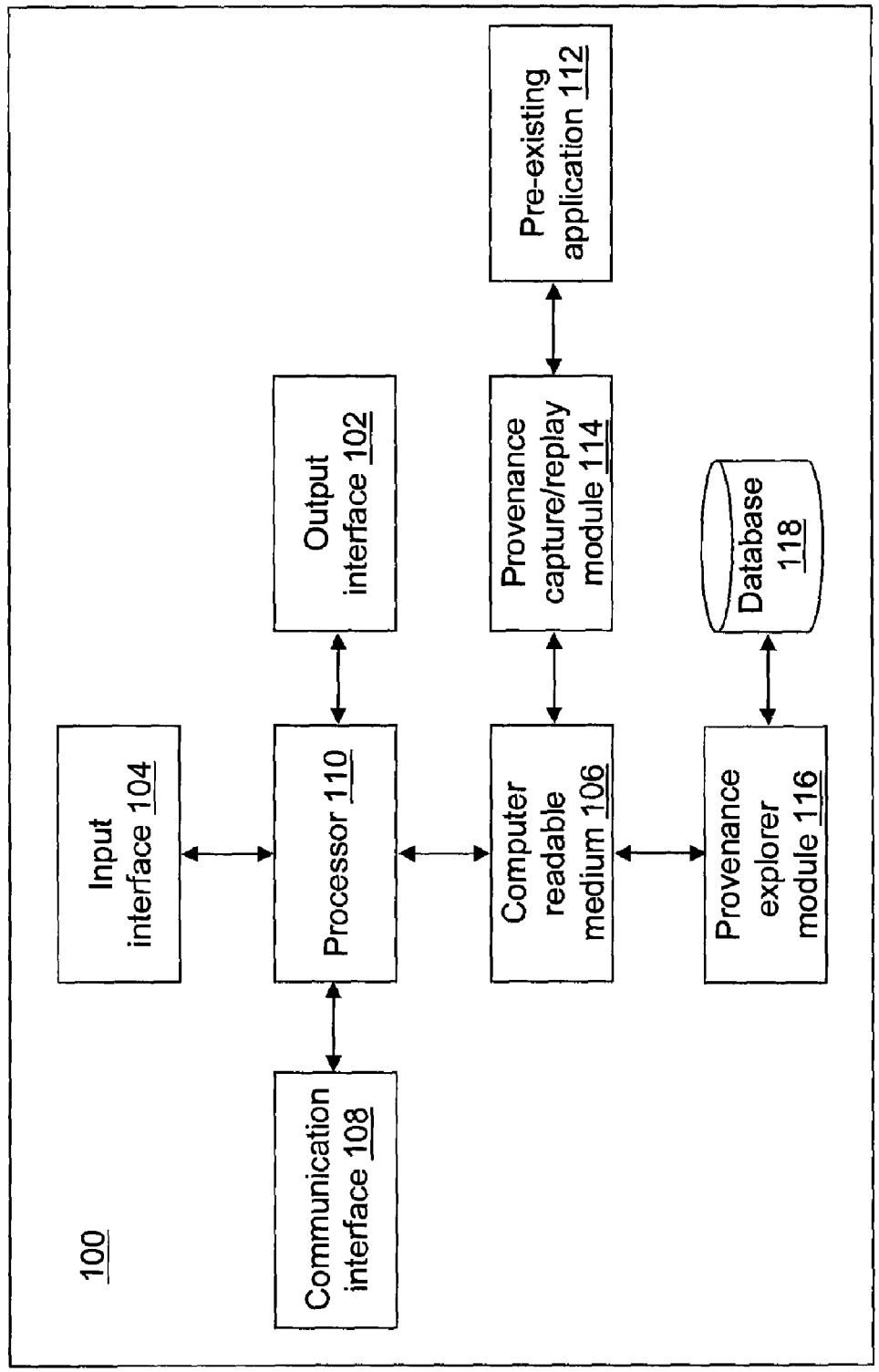
FIG. 1 depicts a block diagram of a provenance capturing and processing system in accordance with an exemplary embodiment.

With reference to FIG. 1, a block diagram of a provenance capturing and processing system 100 is shown in accordance with an exemplary embodiment. The components of provenance system 100 may be implemented using one or more computing devices, which may be a computer of any form factor such as a laptop, a desktop, a server, etc. Provenance system 100 may include an output interface 102, an input interface 104, a computer-readable medium 106, a communication interface 108, a processor 110, a pre-existing application 112, a provenance capture/replay module 114, a provenance explorer module 116, and a database 118. Different and additional components may be incorporated into provenance system 100.

Output interface 102 provides an interface for outputting information for review by a user of provenance system 100.

For example, output interface 102 may include an interface to a display, a printer, a speaker, etc. The display may be a thin film transistor display, a light emitting diode display, a liquid crystal display, or any of a variety of different displays known to those skilled in the art. The printer may be any of a variety of printers as known to those skilled in the art. The speaker may be any of a variety of speakers as known to those skilled in the art. Provenance system 100 may have one or more output interfaces that use the same or a different interface technology.

Input interface 104 provides an interface for receiving information from the user for entry into provenance system 100 as known to those skilled in the art. Input interface 104 may interface with various input technologies including, but not limited to, a keyboard, a pen and touch screen, a mouse, a track ball, a touch screen, a keypad, one or more buttons, etc. to allow the user to enter information into provenance system 100 or to make selections presented in a user interface displayed on display 102 under control of pre-existing application 112, provenance capture/replay module 114, and/or provenance explorer module 116. Input interface 104 may provide both an input and an output interface. For example, a touch screen both allows user input and presents output to the user. Provenance system 100 may have one or more input interfaces that use the same or a different interface technology.

Computer-readable medium 106 is an electronic holding place or storage for information so that the information can be accessed by processor 110 as known to those skilled in the art. Computer-readable medium 106 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Provenance system 100 may have one or more computer-readable media that use the same or a different memory media technology. Provenance system 100 also may have one or more drives that support the loading of a memory media such as a CD, a DVD, a flash memory card, etc.

Communication interface 108 provides an interface for receiving and transmitting data between devices using various protocols, transmission technologies, and media as known to those skilled in the art. The communication interface may support communication using various transmission media that may be wired or wireless. Provenance system 100 may have one or more communication interfaces that use the same or different protocols, transmission technologies, and media.

One or more of the components of provenance system 100 may interact through communication interface 108 using a network such as a local area network (LAN), a wide area network (WAN), a cellular network, the Internet, etc. Thus, the components of provenance system 100 may be implemented at a single computing device or a plurality of computing devices in a single location, in a single facility, and/or may be remote from one another. For example, communication interface 108 may support communication between pre-existing application 112, provenance capture/replay module 114, and/or provenance explorer module 116 when one or more of pre-existing application 112, provenance capture/replay module 114, and/or provenance explorer module 116 is executing at a separate device.

Processor 110 executes instructions as known to those skilled in the art. The instructions may be carried out by a special purpose computer, logic circuits, or hardware circuits. Thus, processor 110 may be implemented in hardware, firmware, software, or any combination of these methods. The term "execution" is the process of running an application or the carrying out of the operation called for by an instruction. The instructions may be written using one or more programming language, scripting language, assembly language, etc. Processor 110 executes an instruction, meaning that it performs the operations called for by that instruction. Processor 110 operably couples with output interface 102, with input interface 104, with computer-readable medium 106, and with communication interface 108 to receive, to send, and to process information. Processor 110 may retrieve a set of instructions from a permanent memory device and copy the instructions in an executable form to a temporary memory device that is generally some form of RAM. Provenance system 100 may include a plurality of processors that use the same or a different processing technology.

Figure 2:
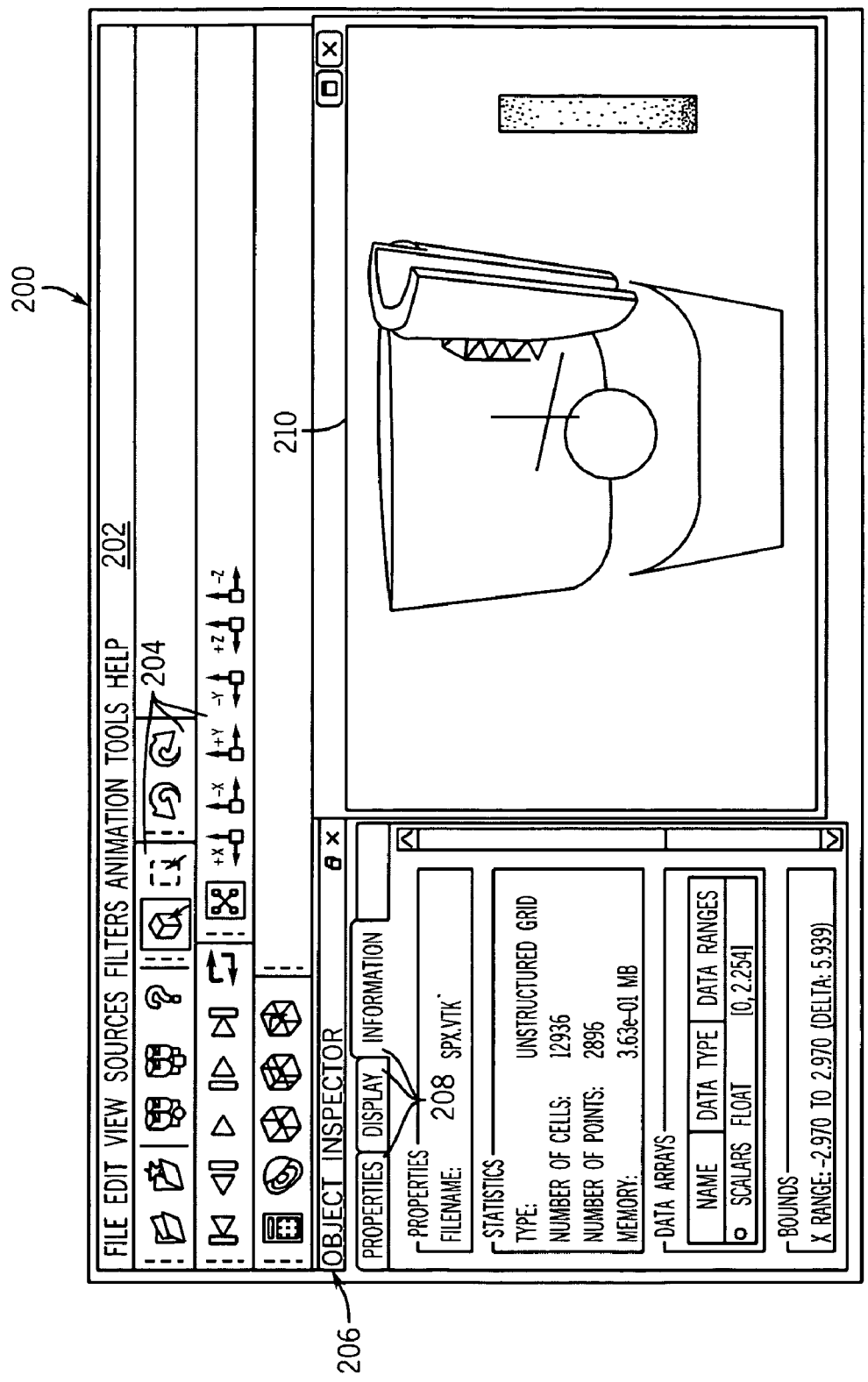
FIG. 2 depicts a user interface of a pre-existing application in accordance with an exemplary embodiment.

Pre-existing application 112 provides a graphical user interface with user selectable and controllable functionality. For example, with reference to FIG. 2, pre-existing application 112 is shown in accordance with an exemplary embodiment. Pre-existing application 112 includes a user interface window 200. User interface window 200 may include a menu bar 202, one or more tool bars 204, a control window 206, and/or a visualization window 210. Menu bar 202 may include a plurality of drop-down menu selections as known to those skilled in the art. Tool bars 204 may include one or more control buttons as known to those skilled in the art. Control window 206 may include one or more controls for selection and/or specification of a control parameter by a user. In the exemplary embodiment of FIG. 2, control window 206 includes a plurality of user selectable tab windows. Each tab window may include a unique set of controls for selection and/or specification of a control parameter by a user. Visualization window 210 may include a variety of visual elements such as graphs, curves, histograms, three-dimensional wire diagrams, three-dimensional solid diagrams, etc. that may be created by pre-existing application 112 based on user interaction with the controls. Pre-existing application 112 can provide functionality in fields such as science, finance, engineering, and medicine to support data mining, computational geometric modeling, imaging, simulation, animation, etc.

Provenance capture/replay module 114 provides an infrastructure for systematically capturing provenance during execution and user interaction with pre-existing application 112. As a user makes changes to the state of pre-existing application 112 through interaction with user interface window 200, provenance capture/replay module 114 captures those changes. Provenance capture/replay module 114 uses a change-based model that captures the operations, or actions, that are applied to pre-existing application 112. This representation is simple and compact as opposed to the alternative of storing multiple instances or versions of the state. In addition, it enables the construction of an intuitive interface that allows users to both understand and interact with the history of the application states through these changes. A tree-based view allows a user to return to a previous version in an intuitive way, to undo bad changes, to compare different application states, and to be reminded of the actions that led to a particular result.

The change actions are represented as a rooted tree in which each node corresponds to a version of the application state, and each edge between nodes $d_p$ and $d_c$, where $d_p$ is the parent of $d_c$, corresponds to the action applied to $d_p$ which generated $d_c$. More formally, let DF be the domain of all possible states of the application, where; $\phi \in DF$ is a special empty state. Also, let x:DF→DF be a function that transforms one state into another, and D be the set of all such functions.

A node corresponding to a state d is constructed by composing a sequence of actions, where each $x_i \in D : d = (x_n \circ (x_{n-1} \circ \ldots \circ (x_1 \circ (\phi) \ldots )))$.

This change based representation is general in that the actions can be captured at different granularities and can be made to match the semantics of a specific pre-existing application 112. In particular, it can be readily applied to create provenance components (plug-ins) that can be integrated with a plurality of pre-existing applications. Provenance can be captured during user interactions with pre-existing application 112 using a custom solution for each pre-existing application 112.

In a first exemplary embodiment, pre-existing application 112 is developed based on a model-view-controller paradigm. In this exemplary embodiment, pre-existing application 112 provides a mechanism for controlling the actions that are being performed by a user interacting with user interface window 200. The model-view-controller paradigm is an architectural pattern used in software engineering that decouples the user interface (view) from the domain-specific logic and access (model) using an event processor (controller). As the user interacts with a view that is generated based on the current model, a registered handler or callback is triggered in the controller. The controller updates the model so that the view can be recreated. Because all of the events that are generated by pre-existing application 112 pass through one event handler, capturing the interactions can be performed either by modifying this controller directly, or by intercepting and fabricating the events via a callback mechanism.

In general, applications that utilize the model-view-controller paradigm have a mechanism for storing and re-using actions: the undo and redo operations as known to those skilled in the art. For example, in a three-dimensional modeling system, with undo a user is able to walk backwards through the steps the user took to create a model. The undo function implemented within pre-existing application 112 provides context for the granularity of actions to be captured during execution of pre-existing application 112. The designers of pre-existing application 112 determined the appropriate granularity of actions in their design of the undo stack. The undo stack of an application may individually capture single mouse events or keyboard strokes if they are needed to recreate the state. Furthermore, interactions performed by the user may cause multiple actions to be performed, which the undo stack stores as one step.

In a first exemplary embodiment, provenance capture/replay module 114 captures actions as they are being added to the undo stack. For example, a callback function may be inserted into the undo routine of pre-existing application 112 that notifies provenance explorer module 116 that an action has been added to the undo stack and what that action comprises. Monitoring code in the undo mechanism is more specifically a callback function that is inserted into the undo routine that notifies the provenance explorer module that an action was added to the stack and what that action is. One or more user interactions with pre-existing application 112 can trigger an action to be placed on the undo stack. The actions are captured and communicated to provenance explorer module 116. The actions may be communicated using a communication application programming interface (API) that uses sockets to send and to retrieve actions from the controller of pre-existing application 112 to provenance explorer module 116. The actions sent across the socket are strings that represent the actions that have been captured or are to be executed by pre-existing application 112. These actions can be persisted in Database 118, from where they can be retrieved by the Provenance Explorer 116. Alternatively, the Provenance Explorer can store the actions it receives in the database. When provenance explorer module 116 receives a new action, provenance explorer module 116 creates an action that contains a command or commands associated with the action along with additional metadata that is automatically and/or manually created. Automatically created metadata includes the date and time the command was executed, the user who created it, a unique identifier for the action, and the identifier for the action that precedes the new action. Other metadata, such as annotation notes or a tag to label the action, can be added by the user using provenance explorer module 116.

In an exemplary embodiment, the set of actions are stored by provenance explorer module 116 in the extensible markup language (XML) described by the following partial schema given in a terse form:
type Vistrail=vistrail [@version, @id, @name, Action*, annotation?]
type Action=action [@date, @user, @id, @parentId, @command, tag?, annotation?]

In a second exemplary embodiment, provenance capture/replay module 114 captures actions based on a previous state, $s_p$, and a current state, $s_c$. The application state is monitored. For example, callbacks may be inserted into routines that update the state of pre-existing application 112. These callbacks notify provenance explorer module 116 that the state of pre-existing application 112 has changed and what the current and previous states comprise. Many applications contain a data structure that represents the current state of the application. For graphical applications, the state may be represented by a scene graph. By monitoring changes to the state and computing the difference between the current state and the previous state, the actions can be captured as the set of changes that take $s_p$ to $s_c$. The actions are captured and communicated to provenance explorer module 116.

In a third exemplary embodiment, provenance capture/replay module 114 captures actions by monitoring the event handler of pre-existing application 112 that is event-driven. For example, a callback may be inserted directly into the routine of pre-existing application 112 that processes events for pre-existing application 112. This callback notifies provenance explorer module 116 of the events that are passing through the event handler. However, the granularity of actions captured is a consideration. For example, capturing all mouse events or key strokes may be too fine of a capture mechanism to be useful. In the first exemplary embodiment, provenance capture/replay module 114 utilized the pre-designed granularity of the undo mechanism for an action. The undo mechanism is typically designed to store actions at the level of granularity that is optimal for the user. However, another mechanism may be used for the second exemplary embodiment and the third exemplary embodiment of provenance capture/replay module 114. Events can be accumulated in the event handler or by monitoring the application state and stored in a list. As a new action is placed on the undo stack, the list of events is packaged as a single action and communicated to provenance explorer module 116 to maintain the same level of granularity as the undo stack while allowing alternate methods for capturing an action.

As a first example implementation, a provenance capture/replay module was developed for a pre-existing application named ParaView and copyrighted by Sandia Corporation, Kitware, Inc. Paraview is open-source so access to the entire code base is provided to support capture and playback of the actions. Though the capture could be done using any of the three exemplary embodiments described above, the simplest method was to monitor the undo stack. When the user performs operations, they are placed on the undo stack as strings that define the operations and their parameters. Since every action in ParaView is reversible, when undo is invoked the action on top of the stack is executed in reverse. To capture provenance, the provenance capture/replay module captures each action that is placed on the undo stack as a string and communicates the action to provenance explorer module 116. In a test case, Paraview was executed, a volume was loaded from a file, an accept button was selected, a cut tool was selected, and a second accept button was selected. The four actions captured and communicated to provenance capture/replay module 114 were the following strings:

1. "Create Reader"
2. "Accept"
3. "Create Cut"
4. "Accept"

The strings are directly executable in ParaView's event handler.

As a second example implementation, a provenance capture/replay module was developed for a pre-existing application marketed under the trademark Maya® by Autodesk, Inc. Maya is not open-source. Instead, only a limited subset of the functionality of the system is accessible through a plug-in API. The provenance capture/replay module monitors both the state and the undo stack. When the user performs an operation, the scene graph of the application is updated, and the operation is placed on the undo stack. When the user invokes undo, the operation on the stack is performed in reverse, and the scene graph is updated accordingly. To capture the provenance, the provenance capture/replay module monitors the scene graph for changes, which are provided in Maya's MEL scripting language. The provenance capture/replay module maintains a list of the changes as they occur. When a new action is placed on the undo stack, the provenance capture/replay module triggers an update that packages the list of MEL commands into one action and communicates the action to provenance explorer module 116.

As a concrete example, a simple sphere was created within Maya by selecting a sphere tool, pressing the mouse to identify a center for the sphere, and dragging the mouse to define the radius for the sphere. The set of interactions was captured as a series of changes to the scene graph, identified by the undo mechanism as a single action, then communicated to provenance explorer module 116 as the following string:

```
createNode -ss "polySphere" -n "polySphere1";
setAttr "polySphere1.r" 8.3242548473969933;
createNode -ss "transform" -n "pSphere1";
setAttr "pSphere1.t" -type "double3"
 -5.5553350015528054 0 0.27165267088301;
createNode -ss "mesh" -n "pSphereShape1" -p "pSphere1";
setAttr -k off "pSphereShape1.v";
setAttr "pSphereShape1.vir" yes;
setAttr "pSphereShape1.vif" yes;
setAttr "pSphereShape1.uvst[0].uvsn" -type "string" "map1";
setAttr "pSphereShape1.cuvs" -type "string" "map1";
setAttr "pSphereShape1.dcc" -type "string" "Ambient+Diffuse";
setAttr "pSphereShape1.covm[0]" 0 1 1;
setAttr "pSphereShape1.cdvm[0]" 0 1 1;
connectAttr "pSphereShape1.iog" "initialShadingGroup.dsm" -na;
setAttr "pSphereShape1.ds" yes;
setAttr "pSphereShape1.tgsp" 0;
setAttr "pSphereShape1.tsa" 0;
connectAttr "polySphere1.out" "pSphereShape1.i" -f;
setAttr "pSphere1.tx" -5.5553350015528054;
setAttr "pSphere1.tz" 0.27165267088301448;
setAttr "polySphere1.r" 8.3242548473969933;
```

The string is a MEL script that is directly executable by Maya. The commands "createNode" and "connectAttr" update the underlying scene graph (or state) of Maya by adding new objects and parameters.

Provenance explorer module 116 may store the received actions in database 118. A plurality of provenance files may be stored and organized in database 118 from the same or different pre-existing applications 112. Database 118 may include a structured query language database. The database may be organized into multiple databases to improve data management and access. The multiple databases may be organized into tiers. Additionally, database 118 may comprise a file system including a plurality of data files. Thus, different storage architectures can be used for the provenance information. They include files in a file system, native XML databases, relational databases, SQL databases, etc. Database 118 may further be accessed by remote users using communication interface 108. Remote users may checkout and checkin data and/or files from database 118 as known to those skilled in the art.

Provenance explorer module 116 also provides a graphical user interface for executing and querying provenance data as part of an evolutionary computational process developed through use of pre-existing application 112. Provenance explorer module 116 may trigger execution of pre-existing application 112 when provenance data is accessed so that a graphical user interface for executing and querying the provenance data and a graphical user interface for pre-existing application 112 are opened together.

Figure 3:
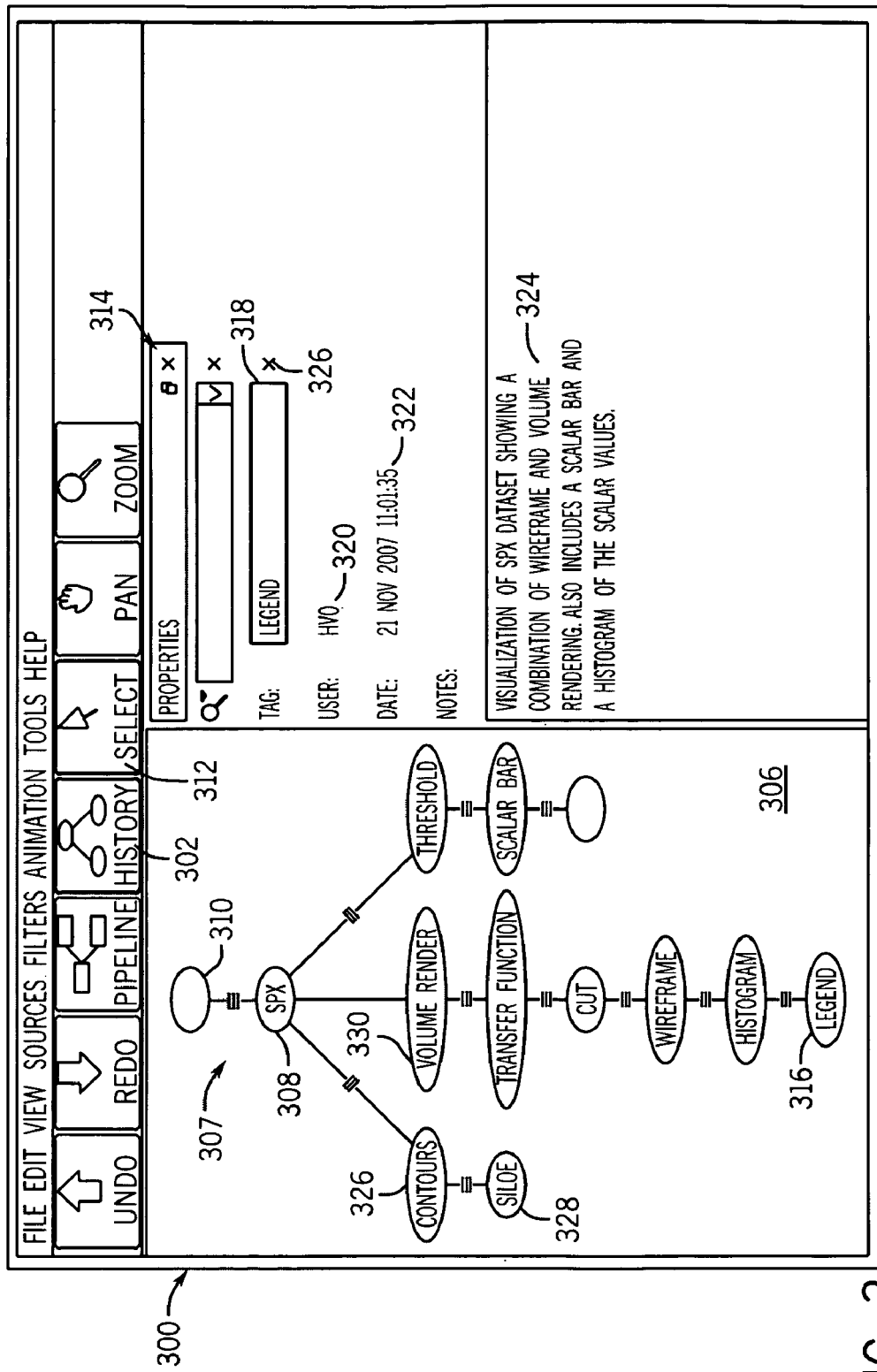
FIG. 3 depicts a user interface of provenance explorer module displaying a version tree in accordance with an exemplary embodiment.

With reference to FIG. 3, a user interface 300 of provenance explorer module 116 is shown in accordance with an exemplary embodiment. User interface 300 may include a history control button 302, a pipeline control button 304, a select button 312, a visualization window 306, and a properties window 314. Receipt of a user selection of history control button 302 causes presentation of a version tree 307 based on provenance data selected by the user. In workflow-based systems, pipeline control button 304 presents the workflow to the user. For example, the user may select a provenance data file from a plurality of provenance data files for analysis. Provenance explorer module 116 presents the plurality of provenance data files for analysis to the user, receives the user selection, reads the provenance data information, and presents version tree 307 to the user.

The stored provenance consists of one or more change actions applied as part of user interactions or explorations with pre-existing application 112. The provenance is represented as a rooted version tree, where each node corresponds to a change action of a computational process and where edges between nodes correspond to the action applied to create one from the other. The version tree reflects the process followed by the user in the creation and exploration of a data product and concisely represents all the states of pre-existing application 112 during this process.

With reference to FIG. 3, visualization window 306 includes version tree 307 presented based on user selection of history control button 302. Version tree 307 indicates a parent-child relationship between a root node 310 which is an empty action and a first node 308, a parent-child relationship between first node 308 and a second node 326, a parent-child relationship between second node 326 and a third node 328, and a parent-child relationship between first node 308 and a fourth node 330, etc. First node 308 is indicated as an oval which includes a name associated with the first action and a line which connects first node 308 to second node 326. The line indicates that first node 308 is a parent of second node 326. Similarly, second node 326 is indicated as an oval which includes a name associated with the second action and a line which connects second node 326 to third node 328. The line indicates that second node 326 is a parent of third node 328. Third node 328 is indicated as an oval which includes a name associated with the third action. A line also connects first node 308 to fourth node 330. The line indicates that first node 308 is a parent of fourth node 330. Similarly, fourth node 330 is indicated as an oval which includes a name associated with the fourth action.

The user optionally may show all nodes in the version tree or may only show nodes that have been named or tagged. A connection between named nodes may be represented in different ways. For example, a connection may be indicated with three perpendicular lines crossing the connection line to represent that a plurality of actions are performed to create the child. For example, the line connecting first node 308 with second node 326 includes three perpendicular lines crossing the connection line to represent that a plurality of actions are performed to create the state associated with second node 326 from the state associated with first node 308. A connection without the three perpendicular lines may indicate that a single action is performed to create the child.

In the exemplary embodiment of FIG. 3, properties window 314 is shown with properties associated with a selected node 316 selected by the user from version tree 307 after selection of select button 312. Selection by the user of a different node of version tree 307 causes a corresponding change in the properties presented in properties window 314. In the exemplary embodiment of FIG. 3, selected node 316 is highlighted to indicate selection by the user. Properties window 314 includes a node name textbox 318 for selected node 316, an author text field 320, a creation date text field 322, and a notes text area 324. The user can change the name of selected node 316 by entering a new name in node name textbox 318 and selecting a "change" button 326. The new name is presented in the oval associated with selected node 316 and is updated in database 118.

Figure 4:
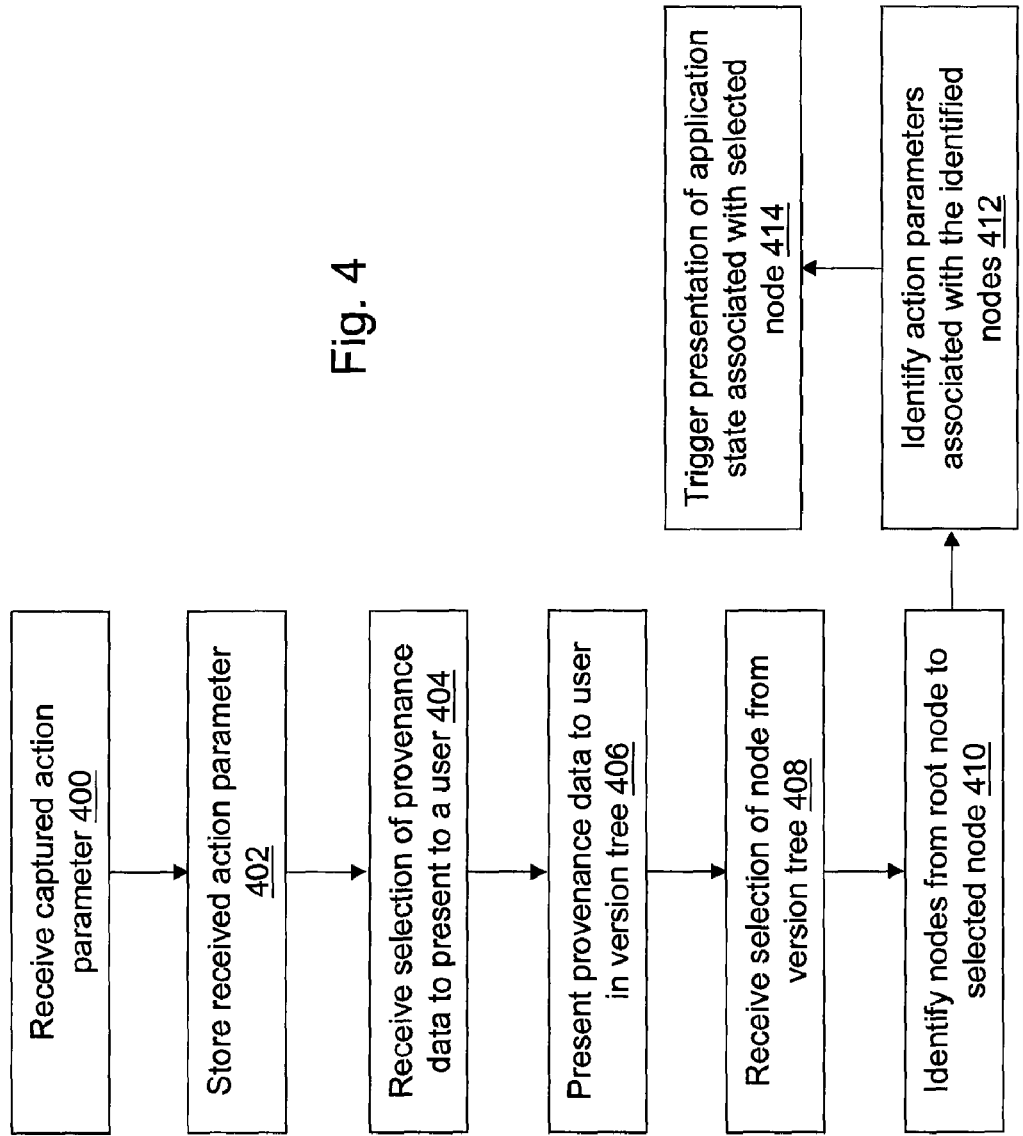
FIG. 4 depicts a flow diagram illustrating exemplary operations performed by the provenance explorer module of FIG. 3 in accordance with an exemplary embodiment.

With reference to FIG. 4, exemplary operations associated with provenance explorer module 116 are described. Additional, fewer, or different operations may be performed, depending on the embodiment. The order of presentation of the operations of FIG. 4 is not intended to be limiting. In an operation 400, an action parameter associated with an action captured by provenance capture/replay module 114 based on a user's interaction with pre-existing application 112 is received by provenance explorer module 116. In an operation 402, the received action parameter is stored by provenance explorer module 116, for example, in database 118. Operations 400 and 402 may be repeated until a user closes pre-existing application 112. In an operation 404, a selection of provenance data to present to a user is received by provenance explorer module 116. In an operation 406, the actions captured by provenance capture/replay module 114 are presented to the user in the form of a version tree as discussed previously. In an operation 408, a selection of a node in the version tree is received by provenance capture/replay module 114. In an operation 410, the nodes from the root node of the version tree to the selected node are identified. In an operation 412, the action parameters associated with the identified nodes are identified.

In an operation 414, presentation of the state of pre-existing application 112 associated with the selected node is triggered in the user interface window 200 of pre-existing application 112 by combining the action parameters associated with each of the identified nodes and sending the combined actions to pre-existing application 112 in a form for execution by pre-existing application 112. For example, if the user selected third node 328, the action or series of actions from root node 310 to third node 328 are replayed by feeding the actions associated with first node 308, second node 326, and third node 328 to the undo mechanism of pre-existing application 112. As another example, when the user selects selected node 316 in the version tree, a MEL script is created by traversing the tree from root node 310 to selected node 316, the scene is cleared, and the script is executed. For efficiency, the script can be condensed by removing actions that do not effect the final outcome or intermediate scene graphs can be stored in the version tree at frequently used paths to reduce the number of actions that need to be executed. Pre-existing application 112 receives the combined actions, clears the current state, and uses the actions either as a series of events that are executed by the controller or as direct updates to the model state. Thus, the actions are executed by pre-existing application 112 by sending them to the same routines that are monitored through callbacks. For example, if capture occurs in the undo routine, the redo routine is called with the action. If the capture occurs by monitoring the state of the application, the routines that change the state are called. If the capture occurs in the event handling routine, the event handler is provided with the action for replay.

User interaction with pre-existing application 112 after presenting the associated state in pre-existing application 112 creates a branch in the version tree. For example, in the exemplary embodiment of FIG. 3, three branches extend from first node 308. User selection of first node 308 triggers presentation of the state of pre-existing application 112 associated with first node 308 in pre-existing application 112. A subsequent user interaction with pre-existing application 112 may cause creation of second node 326. A subsequent user selection of first node 308 again triggers presentation of the state of pre-existing application 112 associated with first node 308 in pre-existing application 112. A subsequent user interaction with pre-existing application 112 then may cause creation of fourth node 330 creating a new branch from first node 308 in the version tree.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device for providing provenance management for a pre-existing application, the device comprising:
a processor; and
a computer-readable medium including computer-readable instructions stored therein that, when executed by the processor, cause the device to
receive a provenance data selection, the provenance data selection indicating provenance data to present to a user;
present the provenance data to the user as a version tree comprising a plurality of connected nodes;
receive a node selection, the node selection indicating a node selected from the version tree;
identify one or more nodes from a root node of the plurality of connected nodes to the node selected from the version tree;
identify one or more action parameters associated with the identified one or more nodes, wherein an action parameter of the one or more action parameters is associated with a previous interaction with a pre-existing application; and
trigger presentation of a previous state of the pre-existing application associated with the node selected from the version tree, by combining the identified one or more action parameters associated with the identified nodes and sending the combined action parameters to the pre-existing application in a form for execution by the pre-existing application.

2. A computer-readable medium including computer-readable instructions stored therein that, when executed by a processor, cause a computing device to:
receive a provenance data selection, the provenance data selection indicating provenance data to present to a user;
present the provenance data to the user as a version tree comprising a plurality of connected nodes;
receive a node selection, the node selection indicating a node selected from the version tree;
identify one or more nodes from a root node of the plurality of connected nodes to the node selected from the version tree;
identify one or more action parameters associated with the identified one or more nodes, wherein an action parameter of the one or more action parameters is associated with a previous interaction with a pre-existing application; and
trigger presentation of a previous state of the pre-existing application associated with the node selected from the version tree, by combining the identified one or more action parameters associated with the identified nodes and sending the combined action parameters to the pre-existing application in a form for execution by the pre-existing application.

3. A method of providing provenance management for a pre-existing application, the method comprising:
receiving a provenance data selection, the provenance data selection indicating provenance data to present to a user;
presenting the provenance data to the user as a version tree comprising a plurality of connected nodes;
receiving a node selection, the node selection indicating a node selected from the version tree;
identifying one or more nodes from a root node of the plurality of connected nodes to the node selected from the version tree;
identifying one or more action parameters associated with the identified one or more nodes, wherein an action parameter of the one or more action parameters is associated with a previous interaction with a pre-existing application; and
triggering presentation of a previous state of the pre-existing application associated with the node selected from the version tree, by combining the identified one or more action parameters associated with the identified nodes and sending the combined action parameters to the pre-existing application in a form for execution by the pre-existing application.

4. The computer-readable medium of claim 2, wherein the computer-readable instructions further cause the computing device to receive the one or more action parameters associated with the previous interaction with the pre-existing application.

5. The computer-readable medium of claim 4, wherein the computer-readable instructions further cause the computing device to store the received one or more action parameters as part of the provenance data in a database.

6. The computer-readable medium of claim 2, wherein the computer-readable instructions further cause the computing device to receive metadata associated with the one or more action parameters.

7. The computer-readable medium of claim 6, wherein the computer-readable instructions further cause the computing device to store the received metadata as part of the provenance data in a database.

8. The computer-readable medium of claim 2, wherein the computer-readable instructions further cause the computing device to define metadata associated with the one or more action parameters.

9. The computer-readable medium of claim 8, wherein the computer-readable instructions further cause the computing device to store the defined metadata as part of the provenance data in a database.

10. The computer-readable medium of claim 2, wherein an action parameter of the one or more action parameters includes a command executable by the pre-existing application.

11. The computer-readable medium of claim 10, wherein the command is stored as a string.

12. The computer-readable medium of claim 2, wherein the computer-readable instructions further cause the computing device to capture an action associated with an interaction with the pre-existing application.

13. The computer-readable medium of claim 12, wherein the computer-readable instructions further cause the computing device to define the action parameter based on the captured action.

14. The computer-readable medium of claim 12, wherein the action is captured by monitoring an undo mechanism of the pre-existing application.

15. The computer-readable medium of claim 12, wherein the action is captured by determining a difference between a current state of the pre-existing application and the previous state of the pre-existing application.

16. The computer-readable medium of claim 15, wherein the action is captured as the difference between the current state of the pre-existing application and the previous state of the pre-existing application after an undo mechanism of the pre-existing application is triggered.

17. The computer-readable medium of claim 2, wherein sending the combined action parameters to the pre-existing application in the form for execution by the pre-existing application comprises sending the combined action parameters to the redo mechanism of the pre-existing application.

* * * * *